(12) United States Patent
Miyazaki et al.

(10) Patent No.: US 8,279,360 B2
(45) Date of Patent: Oct. 2, 2012

(54) PROJECTION TYPE LIQUID CRYSTAL DISPLAY APPARATUS

(75) Inventors: Masafumi Miyazaki, Kumamoto (JP); Moriyasu Nagura, Kumamoto (JP); Yoshihiro Mizuguchi, Kumamoto (JP); Naoki Uneda, Kumamoto (JP)

(73) Assignee: Sony Corporation, Tokyo (JP)

( * ) Notice: Subject to any disclaimer, the term of this patent is extended or adjusted under 35 U.S.C. 154(b) by 193 days.

(21) Appl. No.: 12/923,540

(22) Filed: Sep. 28, 2010

(65) Prior Publication Data
US 2011/0013102 A1 Jan. 20, 2011

(30) Foreign Application Priority Data

Apr. 22, 2009 (JP) ................................. 2009-104370
Oct. 15, 2009 (JP) ................................. 2009-238211

(51) Int. Cl.
*G02F 1/1335* (2006.01)
(52) U.S. Cl. ................................. 349/8; 349/5
(58) Field of Classification Search .................... 349/5–8
See application file for complete search history.

(56) References Cited

U.S. PATENT DOCUMENTS

| | | | | |
|---|---|---|---|---|
| 6,097,449 A * | 8/2000 | Yamamoto et al. | ............... | 349/5 |
| 6,142,634 A * | 11/2000 | Ogawa et al. | .................. | 353/38 |
| 6,607,276 B1 * | 8/2003 | Akiyama | ....................... | 353/38 |
| 6,811,262 B2 * | 11/2004 | Takezawa et al. | ............... | 353/20 |
| 6,837,582 B2 * | 1/2005 | Yamagishi | ...................... | 353/30 |
| 6,882,480 B2 * | 4/2005 | Yanagisawa | .................. | 359/634 |
| 6,903,827 B2 * | 6/2005 | Kitabayashi et al. | ......... | 356/614 |
| 6,935,753 B2 * | 8/2005 | Takezawa et al. | ............ | 353/119 |
| 7,036,941 B2 * | 5/2006 | Akiyama et al. | ............. | 353/102 |
| 7,040,761 B2 * | 5/2006 | Okuyama et al. | ............... | 353/38 |
| 7,052,141 B2 * | 5/2006 | Akiyama | ........................ | 353/38 |
| 7,118,229 B2 * | 10/2006 | Iechika et al. | ................. | 353/102 |
| 7,123,311 B2 * | 10/2006 | Yamakawa | .................... | 348/744 |
| 7,137,705 B2 * | 11/2006 | Kitabayashi | .................... | 353/31 |
| 7,198,374 B2 * | 4/2007 | Iechika et al. | .................. | 353/33 |
| 2001/0028423 A1 * | 10/2001 | Sawai et al. | ..................... | 349/96 |
| 2003/0133078 A1 * | 7/2003 | Iechika et al. | .................. | 353/24 |

FOREIGN PATENT DOCUMENTS

| | | |
|---|---|---|
| JP | 05-341283 | 12/1993 |
| JP | 06-075212 | 3/1994 |

* cited by examiner

*Primary Examiner* — Rhonda Peace
(74) *Attorney, Agent, or Firm* — Rader Fishman & Grauer, PLLC

(57) ABSTRACT

A projection type liquid crystal display apparatus includes: a light source; a liquid crystal display device; and a projection lens projecting light modulated by the liquid crystal display device. The liquid crystal display device includes a liquid crystal layer, a pixel electrode section having two-dimensionally disposed pixel apertures through which light can pass, and first and second microlens arrays formed on a light entering side and a light exiting side of the device with respect to the liquid crystal layer, respectively, and being a two-dimensional array of first and second microlenses provided in association with the pixel apertures, respectively. The F-number of the first microlenses is set at a value equal to or greater than that of the projection lens. The first and second microlenses are disposed such that the groups of microlenses are located in the focus position of each other.

7 Claims, 13 Drawing Sheets

PROJECTION TYPE LIQUID CRYSTAL DISPLAY APPARATUS

BACKGROUND OF THE INVENTION

1. Field of the Invention

The present invention relates to a projection type liquid crystal display apparatus including a liquid crystal display device incorporated therein. More particularly, the invention relates to a projection type liquid crystal display apparatus including a liquid crystal display device having microlenses formed on a light entering side thereof.

2. Description of the Related Art

Presently, projection type liquid crystal display apparatus including a liquid crystal display device incorporated therein (liquid crystal projectors) are actively developed. Projection type liquid crystal display apparatus are categorized based on their functions and configurations into data projectors to be used with personal computers, front projectors for home theater applications, rear projectors to be used in used in rear projector televisions, and so on.

Projection type liquid crystal display apparatus are broadly classified into single plate type products employing one liquid crystal display device in which sub-pixels rendered in three colors, i.e., red (R), green (G), and blue (B) are provided at each dot and three plate type products employing three monochromatic liquid crystal display devices or one monochromatic liquid crystal display device in each of R, G, and B optical paths. A projection type liquid crystal display apparatus is categorized as a transmission type projector or a reflection type projector depending on whether the liquid crystal display device serving as the core of the product is a transmission type device or a reflection type device.

There are high level requirements for projection type liquid crystal display apparatus in terms of brightness, image quality, definition, and price. Especially, there are strong demands for improvement in the amount of light projected by such displays.

The amount of projected light is an index of the degree of visibility of the image projected, and one factor determining the amount of projected light is the liquid crystal display device used. A liquid crystal display device has the function of spatially modulating light emitted by a light source according to an image signal and outputting a modulated image thus obtained. The light modulated by the liquid crystal display device is projected onto a projection surface such as a screen or wall to form an image on the projection surface.

Such a liquid crystal display device includes thin film transistors (TFTs) and the like fabricated on a substrate to drive pixels, and a light blocking region called a black matrix is provided such that it intervenes between each pair of adjoining pixels. Therefore, no such liquid crystal display device has an aperture ratio of 100%.

Under the circumstance, one approach taken in the related art toward improvement in the effective aperture ratio of a liquid crystal display device is to dispose a microlens in association with each dot (each pixel or sub-pixel) in the direction of the optical axis of the dot, the microlenses being formed on a substrate provided on a light entering side of the device. The effective aperture ratio of a liquid crystal display device is the ratio of total amount of light beams exiting the liquid crystal display device to the total amount of light beams entering the liquid crystal display device. When defining the effective aperture ratio of a projection type liquid crystal display apparatus, attention is paid not only to optical loss at the liquid crystal display device but also to optical vignetting which can occur at a projection lens provided downstream of the device.

When microlenses are disposed on a substrate provided on a light entering side of a liquid crystal display device as thus described, optical loss attributable to the light-blocking effect of a black matrix can be reduced. However, the light exiting the device diverges significantly because of the converging effect of the lenses, which can result in optical vignetting at a projection lens provided downstream of the device. When a projection lens having a small F-number is used, problems such as a cost increase and a reduction in image forming performance can occur.

Under the circumstance, some liquid crystal display devices recently developed include microlenses provided to mitigate the above-described problems in addition to microlenses disposed on a light entering side thereof.

For example, JP-A-6-75212 and JP-A-5-341283 (Patent Documents 1 and 2) disclose liquid crystal display devices having second microlenses for collimating light beams diverged by first microlenses disposed on a light entering side. Such a configuration cancels the divergence of light exiting the devices attributable to the converging effect of the first microlenses. Thus, the divergence of the exiting light is suppressed to achieve a high effective aperture ratio.

SUMMARY OF THE INVENTION

In the liquid crystal display device disclosed in Patent Document 1, the focus position of the first microlenses and the focus position of the second microlenses substantially coincide with each other. As a result, divergent components of illumination light from the light source cannot be properly controlled, and the divergence of light may be promoted against what is intended, depending on the conditions under which the device is used.

In the liquid crystal display device disclosed in Patent Document 2, since both of the first and second microlenses are disposed on the light entering side of the device, it is difficult to provide the device with a great F-number. In addition, since the first and second microlenses are formed on opposite substrates, opposite to each other, the lenses are subjected to significant variations attributable to manufacturing processes, which is likely to result in problems such as quality variations and a low yield of final products.

According to one embodiment of the invention, there is provided a projection type liquid crystal display apparatus including a light source emitting light, a liquid crystal display device optically modulating the light emitted by the light source, and a projection lens projecting the light modulated by the liquid crystal display device. The liquid crystal display device includes a liquid crystal layer, a pixel electrode section having a plurality of two-dimensionally disposed pixel apertures through which light can pass, a first microlens array which is formed on a light entering side of the device with respect to the liquid crystal layer and which is a two-dimensional array of a plurality of first microlenses provided in association with the plurality of pixel apertures, and a second microlens array which is formed on a light exiting side of the device with respect to the liquid crystal layer and which is a two-dimensional array of a plurality of second microlenses provided in association with the plurality of pixel apertures. The F-number of the first microlenses is set at a value equal to or greater than the F-number of the projection lens. The first microlenses and the second microlenses are disposed such that the groups of microlenses are located in the focus positions of each other.

According to another embodiment of the invention, the projection type liquid crystal display apparatus of the above-mentioned embodiment may be configured such that the first microlenses and/or the second microlenses include any of a spherical surface, an aspherical surface, or a Fresnel surface or two or more such surfaces in combination.

According to still another embodiment of the invention, the projection type liquid crystal display apparatus according to the above-mentioned embodiment may be configured to include an active matrix substrate provided on the light exiting side of the device with respect to the liquid crystal layer and carrying a TFT device and the second microlens array thereon. The second microlens array on the active matrix substrate may be disposed between the TFT device and the liquid crystal layer and formed after the TFT device is formed.

According to the embodiments of the invention, a liquid crystal display device can be provided with an improved effective aperture ratio while keeping optical vignetting at a projection lens thereof very small. Thus, the device can project a great amount of light. It is therefore possible to employ a projection lens having a great F-number to keep the cost of the optical system small while keeping the amount of light projected at the same level as in the related art.

DESCRIPTION OF PREFERRED EMBODIMENTS

A projection type liquid crystal display apparatus according to an embodiment of the invention includes a light source emitting light, a liquid crystal display device optically modulating the light emitted by the light source, and a projection lens projecting the light modulated by the liquid crystal display device.

The liquid crystal display device includes, a liquid crystal layer, a pixel electrode section having a plurality of two-dimensionally disposed pixel apertures which allow light to pass, and a first microlens array which is a two-dimensional array of a plurality of first microlenses formed on a light entering side of the liquid crystal layer in association with the plurality of pixel apertures.

Since the first microlenses are formed on the light entering side of the liquid crystal layer as thus described, light can enter the pixel apertures at an improved entrance ratio.

Further, the liquid crystal display device includes a second microlens array which is a two-dimensional array of a plurality of second microlenses formed on a light exiting side of the liquid crystal layer in association with the plurality of pixel apertures.

The first and second microlenses are disposed such that the groups of microlenses reside in the focus positions of each other.

In such a configuration, when illumination light that entered the liquid crystal display device exits from the second microlens array, components of the illumination light at a predetermined divergence angle to the optical axis of the device are eliminated, and the exiting angle of the exiting light is substantially the same as the exiting angle of the principal beam which has entered the device in parallel with the optical axis of the device.

Thus, the divergence of the illumination light can be substantially eliminated at the second microlens array. As a result, the illumination light can enter the device with a great divergence angle, and the light can therefore be utilized with improved efficiency.

In addition, since the F-number of the first microlenses is set equal to or greater than the F-number of the projection lens, optical vignetting at the black matrix can be minimized with vignetting at the projection lens kept extremely small.

Further, since the second microlenses are disposed on the light exiting side, the lenses can be easily provided with a great F-number, which allows variations attributable to manufacturing processes to be suppressed.

The projection type liquid crystal display apparatus according to the embodiment of the invention will now be described in detail with reference to the drawings.

Figure 1:
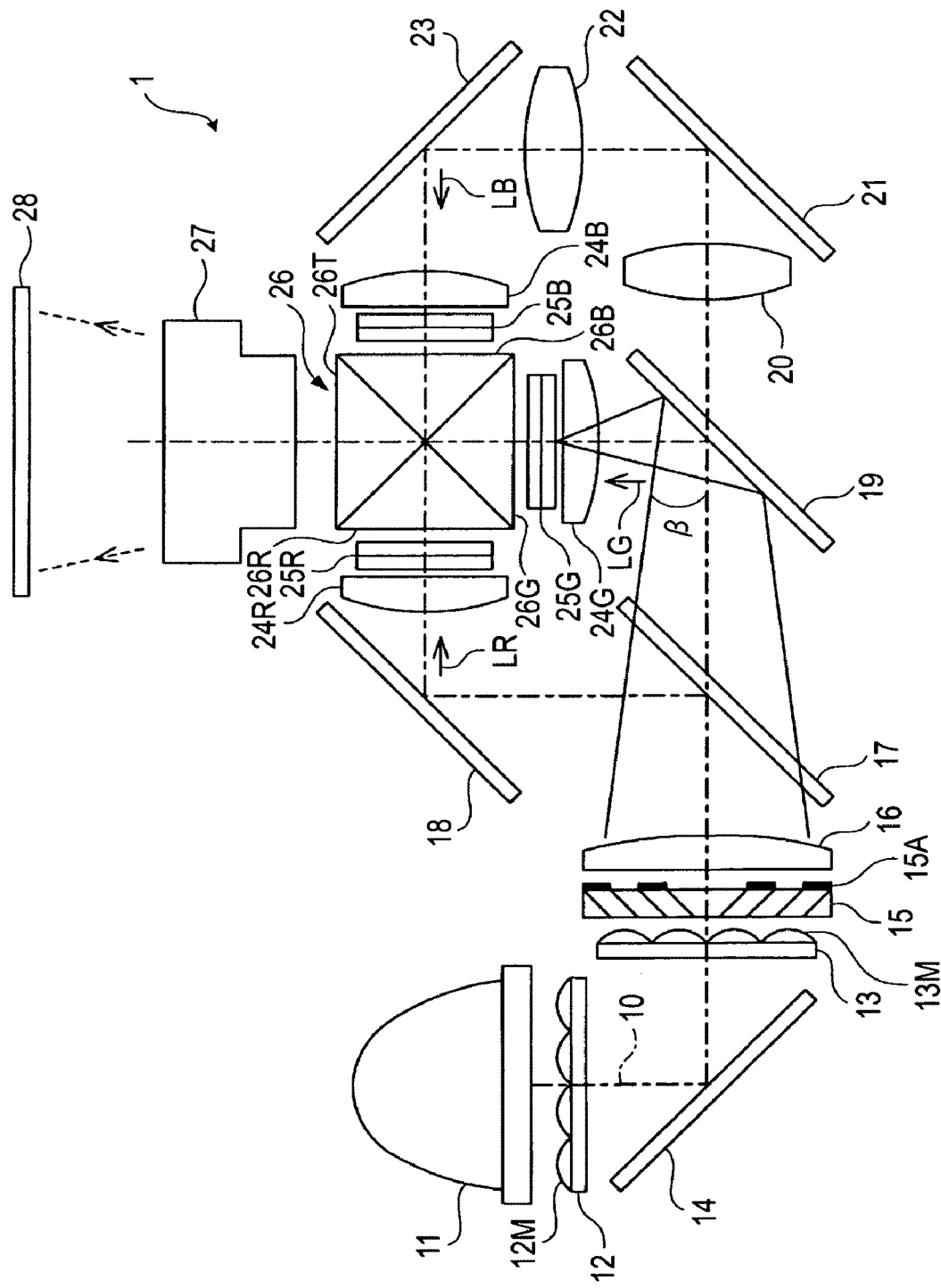
FIG. 1 shows an exemplary schematic configuration of a projection type liquid crystal display apparatus according to an embodiment of the invention.

FIG. 1 shows an exemplary general configuration of the projection type liquid crystal display apparatus according to the present embodiment of the invention. The illustrated liquid crystal display apparatus is a so-called three plate projection type liquid crystal display apparatus in which three transmissive liquid crystal display devices are used to display color images. The following topics will be described in the order listed.

1. General Configuration of Projection Type Liquid Crystal Display Apparatus
    2. Configuration and Operations of Liquid Crystal Display device
    3. Optical Operations and Effects of Microlenses of Liquid Crystal Display device
    4. Manufacturing Method of Liquid Crystal Display device
    5. Other Embodiments

1. General Configuration of Projection Type Liquid Crystal Display Apparatus A projection type liquid crystal display apparatus 1 according to the present embodiment includes a light source 11, a pair of fly-eye lenses, i.e., a first fly-eye lens 12 and a second fly-eye lens 13, a total reflection mirror 14 provided between the fly-eye lenses 12 and 13 and disposed such that it bends an optical path (optical axis 10) at an angle of about 90 deg toward the second fly-eye lens 13.

The light source 11 emits white light which includes red, blue, and green light beams required to display color images. The light source 11 includes a light-emitting body (not shown) emitting white light and a concave mirror reflecting the light emitted by the light-emitting body. For example, a halogen lamp, a metal halide lamp, or a xenon lamp may be used as the light-emitting body. The concave mirror is a mirror having a rotation-symmetric surface such as a spheroidal mirror or a paraboloidal mirror.

The first fly-eye lens 12 and the second fly-eye lens 13 are two-dimensional arrays of respective microlenses, i.e., a plurality of microlenses 12M and a plurality of microlenses 13M. The first fly-eye lens 12 and the second fly-eye lens 13 are provided to obtain a uniform illuminance distribution, and those lenses have the function of splitting incident light into a plurality of small light beams. Therefore, white light emitted by the light source 11 is split into a plurality of small light beams when it is transmitted through the first fly-eye lens 12 and the second fly-eye lens 13.

The projection type liquid crystal display apparatus 1 also includes a PS combining element 15, a condenser lens 16, and a dichroic mirror 17 which are disposed in the order listed on a light exiting side of the second fly-eye lens 13.

Light transmitted through the first fly-eye lens 12 and the second fly-eye lens 13 enters the PS combining element 15. The PS combining element 15 includes a plurality of half-wave plates 15A each of which is provided in a position associated with a position where two microlenses adjoin each other. The PS combining element 15 separates the incident light into first polarized light (P-polarized light component) and second polarized light (S-polarized light component). Either of the two types of polarized light (e.g., the P-polarized light) is allowed to exit the PS combining element 15 with its polariiation direction kept unchanged. The other polarized light (the S-polarized light component in this case) exits the device after being converted into the other type of polarized light component (P-polarized light component in this case) by the effect of the half-wave plate 15A. Thus, the polarization directions of the two types of polarized light separated as described above are equalized into a particular direction (e.g., the P polarization direction).

After exiting the PS combining element 15, the light is transmitted through the condenser lens 16 to enter the dichroic mirror 17. The dichroic mirror 17 separates the incident light into red light LR and light having other colors.

The projection type liquid crystal display apparatus 1 also includes a total reflection mirror 18, a field lens 24R, and a liquid crystal display device 25R which are disposed in the order listed along the optical path of the red light LR separated by the dichroic mirror 17. The total reflection mirror 18 reflects the red light LR separated by the dichroic mirror 17 toward the liquid crystal display device 25R. The red light LR reflected by the total reflection mirror 18 enters the liquid crystal display device 25R through the field lens 24R. After entering the liquid crystal display device 25R, the red light LR is spatially modulated by the liquid crystal display device 25R according to an image signal, and the light thereafter impinges on an entrance surface 26R of a cross prism 26 which will be described later.

The projection type liquid crystal display apparatus 1 further includes a dichroic mirror 19 which is provided on the optical path of the light having other colors separated by the dichroic mirror 17. The dichroic mirror 19 separates the light entering the same into green light LG and blue light LB. The projection type liquid crystal display apparatus 1 also includes a field lens 24G and a liquid crystal display device 25G provided in the order listed on the optical path of the green light LG separated by the dichroic mirror 19. The green light LG enters the liquid crystal display device 25G through the field lens 24G. After entering the liquid crystal display device 25G, the green light LG is spatially modulated by the liquid crystal display device 25G according to the image signal, and the light thereafter impinges on an entrance surface 26G of the cross prism 26.

Further, the projection type liquid crystal display apparatus 1 includes a relay lens 20, a total reflection mirror 21, a relay lens 22, a total reflection mirror 23, a field lens 24B, and a liquid crystal display device 25B which are provided in the order listed on the optical path of the blue light LB separated by the dichroic mirror 19. The total reflection mirror 21 reflects the blue light LB entering the same through the relay lens 20 toward the total reflection mirror 23. The total reflection mirror 23 reflects the blue light LB entering the same through relay lens 22 toward the liquid crystal display device 25B. The liquid crystal display device 25B spatially modulates the blue light LB entering the same through the field lens 24B according to the image signal, and the modulated light thereafter impinges on an entrance surface 26B of the cross prism 26.

The plurality of small split light beams obtained by the first fly-eye lens 12 and the second fly-eye lens 13 which have been magnified impinge on the entrance surface of each of the liquid crystal display devices 25R, 25B, and 25B in an overlapping relationships. Thus, the entrance surface is uniformly illuminated as a whole. Each of the small split light beams obtained by the first fly-eye lens 12 and the second fly-eye lens 13 is magnified at a magnification which is determined by the focal length of the condenser lens 16 and the focal length of the respective microlens 13M provided on the second fly-eye lens 13.

Although not shown, an entrance polarizer is provided on the light exiting side of each of the field lenses 24R, 24G, and 25B to cause polarized light to enter each of the liquid crystal display devices 25R, 25G, and 25B. An exit polarizer is provided on each of the light entering surfaces 26R, 26G, and 26B of the cross prism 26 to control the light modulated by the liquid crystal display devices.

The projection type liquid crystal display apparatus 1 includes the cross prism 26 which is provided in a position where the optical paths of the red light LR, the green light LG, and the blur light LB cross each other to combine the three chromatic light beams LR, LG, and LB. The projection type liquid crystal display apparatus 1 also includes a projection lens 27 for projecting the combined light exiting the cross prism 26 toward a screen 28. The light which has exited the cross prism 26 is projected on a front side or a back side of the screen 28 to form an image on the screen 28. The cross prism 26 has the three entrance surfaces 26R, 26G, and 26B and one exit surface 26T. The red light LR, the green light LG, and the blue light LB from the liquid crystal display devices 25R, 25G, and 25B impinge on the entrance surfaces 26R, 26G, and 26B, respectively. The cross prism 26 combines the three chromatic light beams entering through the entrance surfaces 26R, 26G, and 26B, and the resultant light exits the prism through the exit surface 26T.

2. Configuration and Operations of Liquid Crystal Display Devices

Figure 2:
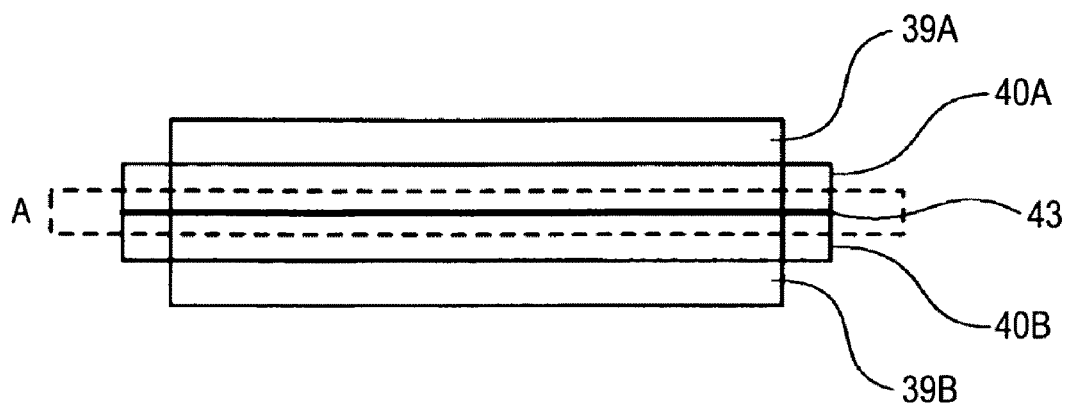
FIG. 2 shows an exemplary schematic configuration of a liquid crystal display device according to the embodiment of the invention.
Figure 3:
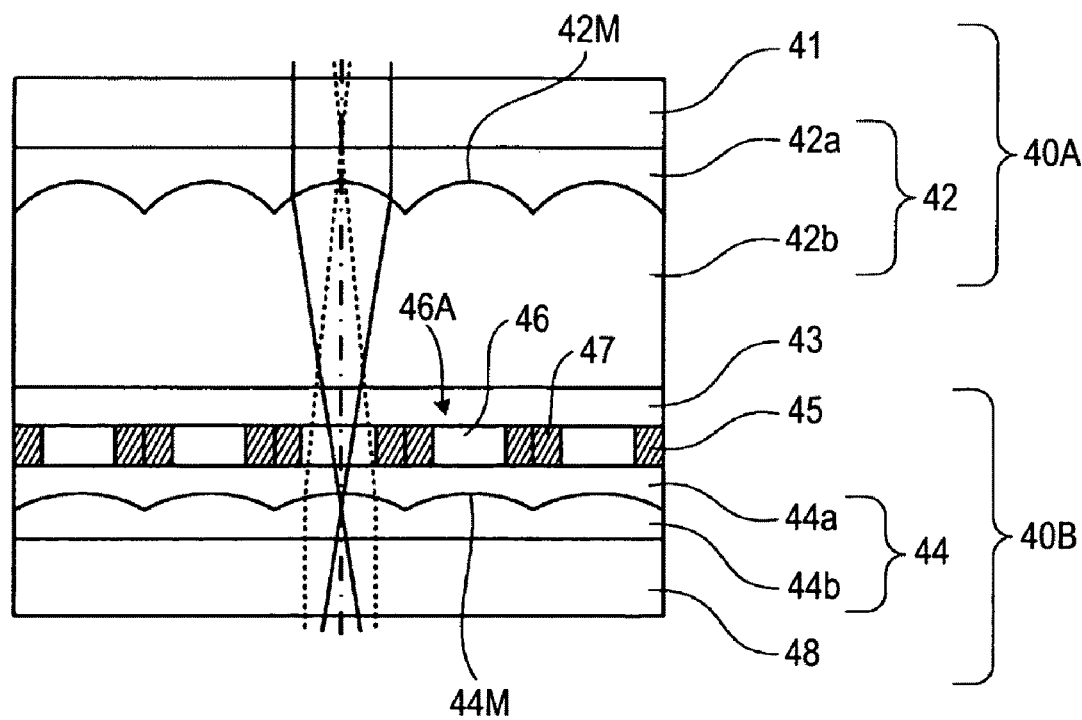
FIG. 3 shows an exemplary schematic configuration of the liquid crystal display device according to the embodiment of the invention.

FIGS. 2 and 3 show an exemplary configuration of the liquid crystal display devices 25R, 25G, and 25B. FIG. 3 is an enlarged view of the region A sown in FIG. 2. The liquid crystal display devices 25R, 25G, and 25B have substantially the same functions and configuration except that they modulate different components of light.

A description will now be made on a configuration of the liquid crystal display devices 25R, 25G, and 25B, the description collectively applying to the devices.

As shown in FIG. 2, a liquid crystal display device 25 (which may be any of the devices 25R, 25G, and 25B) includes an anti-dust glass 39A, an opposite substrate 40A, a liquid crystal layer 43, an active matrix substrate 40B, and another anti-dust glass 39B provided in the order listed from a light entering side of the device.

As shown in FIG. 3, the opposite substrate 40A includes a glass substrate 41 and a first microlens array 42 which are formed in the order listed from the light entering side of the device, the first microlens array 42 being formed on a light exiting side of the glass substrate 41. Although not shown, the opposite electrodes and a alignment film are provided between the first microlens array 42 and the liquid crystal layer 43. The opposite electrodes are provided to generate electrical charge between in cooperation with a pixel electrode section 45.

The first microlens array 42 includes an optical material layer 42a having a low refractive index and another optical material layer 42b having a high refractive index which are formed in the order listed from the light entering side of the device. The array includes a plurality of first microlenses 42M provided in a two-dimensional form in association with respective pixel electrodes 46 which will be described later. Each of the first microlenses 42M has positive refracting power as a whole. In the example, shown in FIG. 3, a lens surface of each of the first microlenses 42M has a spherical shape which constitutes a convex with respect to the light entering side of the device (the side of the device facing the light source). In order to provide the microlens having such a surface shape with positive power, the optical material layer 42a having a low refractive index and the optical material layer 42b having a high refractive index are formed to satisfy a relational expression "n2>n1" where n1 and n2 represent the refractive indexes of the layers 42a and 42b, respectively. The relative refractive index difference between the refractive indexes n2 and n1 is, for example, about 0.2 to 0.3, and it is preferable to keep the difference at a higher value. For example, the optical material layers 42a and 42b are formed from an urethane type or acryl type resin.

The F-number of the first microlenses 42M is set equal to or greater than the F-number of the projection lens 27 provided downstream of them. Therefore, among light beams which have entered the liquid crystal display device 25, most of light beams collected by the first microlenses 42M and made to impinge on the pixel apertures 46A become effective light which can be used for displaying an image, as will be detailed later.

The active matrix substrate 40B includes a glass substrate 48 and a second microlens array 44 and a pixel electrode section 45 which are formed in the order listed on a light entering side of the glass substrate 48. Although not shown, an alignment film is disposed between the pixel electrode section 45 and the liquid crystal layer 43. The pixel electrode section 45 is in the form of a two-dimensional array of pixel electrodes 46 and a black matrix 47. Each pixel electrode 46 is constituted by a conductive transparent member, and the black matrix 47 is formed to intervene between each pair of adjoining pixel electrodes 46. The black matrix 47 is, for example, a metal film which blocks light. In each region surrounded by the black matrix, a TFT device (not shown) is formed to apply a voltage to a pixel electrode 46 adjacent thereto selectively according to an image signal. The aperture of one pixel electrode 46 which is surrounded by the black matrix and through which incident light can be transmitted constitutes a pixel aperture 46A of one pixel (dot).

The second microlens array 44 includes an optical material layer 44b having a high refractive index and another optical material layer 44a having a low refractive index formed in the order listed from the light entering side of the device. The array includes a plurality of second microlenses 44M provided in a two-dimensional form in association with respective pixel electrodes 46 which will be described later. Each of the second microlenses 44M has positive refracting power as a whole. In the example, shown in FIG. 3, a lens surface of each of the second microlenses 44M has a spherical shape which constitutes a convex with respect to the light entering side of the device (the side of the device facing the light source). In order to provide the microlens having such a surface shape with positive power, the optical material layer 44a having a low refractive index and the optical material layer 44b having a high refractive index are formed to satisfy a relational expression "n4>n3" where n3 and n4 represent the refractive indexes of the layers 44a and 44b, respectively. The relative refractive index difference between the refractive indexes n3 and n4 is, for example, about 0.2 to 0.3, and it is preferable to keep the difference at a higher value. For example, the optical material layers 44a and 44b are formed from an urethane type or acryl type resin.

As thus described, the liquid crystal display devices 25 of the present embodiment have a configuration in which two microlenses, i.e., a first microlens 42M and a second microlens 44M are provided in the direction of the optical axis of each dot.

The first microlens 42M and the second microlens 44M are disposed such that the groups of microlenses are located in the focus positions of each other. Specifically, the focus position of the first microlens 42M coincides with the principal point (position H2) of the second microlens 44M (see FIG. 4), and the focus position of the second microlens 44M coincides with the principal point (position H1) of the first microlens 42M (see FIG. 4).

The first microlenses 42M serve as condensing lenses having a light-condensing function to improve the ratio of the amount of illumination light passing through the pixel apertures 46A to the amount of light entering the liquid crystal display device 25. The second microlenses 44M serve as field lenses. It seems that higher aperture efficiency would be achieved the closer the focus position of the first microlenses 42M to the pixel apertures 46A. However, the highest aperture efficiency is not necessarily achieved when the position of the pixel apertures 46A exactly coincides with the focus position of the lenses if all angular components of incident light are taken into consideration. It is desirable to dispose the pixel apertures 46A in the Position of the beam waists of light beams when all angular components are taken into consideration.

The first microlenses 42M and the second microlenses 44M are not limited to the illustrated configurations as long as they have positive power and satisfy predetermined requirements on optical characteristics. For example, each lens may have any of a spherical surface, an aspherical surface, or a Fresnel surface. Alternatively, each lens may be formed with a combination of two or more such surfaces. The first microlenses 42M and the second microlenses 44M may be formed by covering a resin having a high refractive index with a substrate having a low refractive index. Alternatively, the lenses may be formed by molding a material having a high refractive index and a material having a low refractive index using photolithography. In this case, the use of inorganic materials will provided with the lenses with long life.

3. Optical Operations and Effects of Microlenses of Liquid Crystal Display Device A description will now be made by referring primarily to FIG. 4 on optical operations and effects of the first microlenses 42M and the second microlenses 44M of the liquid crystal display devices 25 which are components characteristic of the present embodiment.

Figure 4:
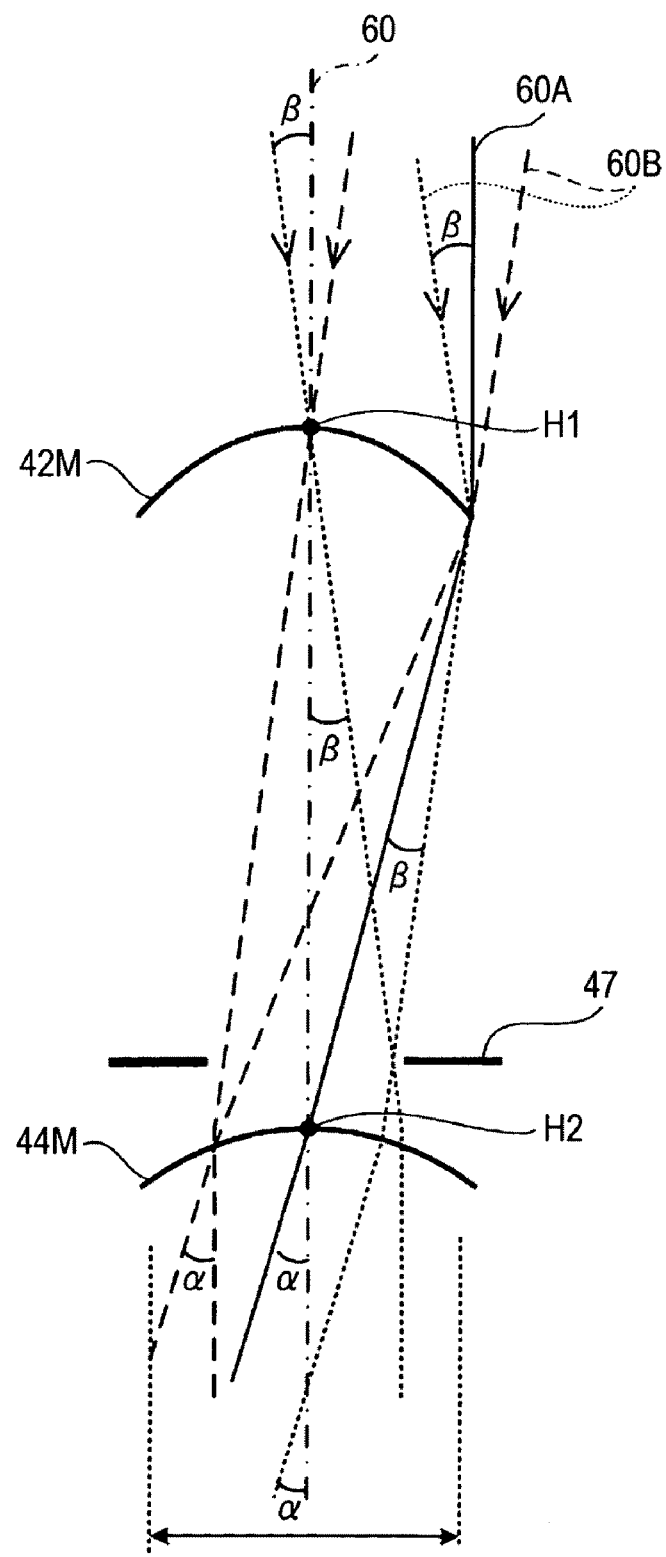
FIG. 4 is a simplified illustration of a configuration of a region of the liquid crystal display device shown in FIG. 3 where microlenses are provided.

For simplicity of illustration, FIG. 4 shows only major parts of a liquid crystal display device 25 located in the region where a first microlens 42M and a second microlens 44M are provided. As described above, the first microlens 42M and the second microlens 44M have positive power. The second microlens 44M is disposed in the focus position of the first microlens 42M, and the first microlens 42M is disposed in the focus position of the second microlens 44M. Further, the pixel aperture 46A is disposed in the position of the beam waists of light beam. The description will be made on an assumption that the entire liquid crystal display device 25 having such a configuration is illuminated by illumination light having a divergence angle β from an illuminating optical system provided upstream of the liquid crystal display device 25.

Let us now discuss divergent light beams 60B (indicated by broken lines in FIG. 4) entering the first microlens 42M and the second microlens 44M, the light beams including components at certain angles to a principal light beam 60A (indicated by a solid line in FIG. 4) which is parallel to an optical axis 60 of the microlenses. Light beams illuminating the liquid crystal display device 25 at an angle of ±β to the optical axis 60 pass through the first microlens 42M at a divergence angle of ±β about the optical axis 60. Since the first microlens 42M is disposed in the focus position of the second microlens 44M, all of such light beams change into beams parallel to the principal light beam 60A when they pass through the second microlens 44M. That is, the principal light beam 60A and the divergent light beams 60B have the same maximum divergence angle θ after they exit the second microlens 44M.

The maximum divergence angle θ of light exiting the liquid crystal display device 25 equipped with the first microlenses 42M and the second microlenses 44M having the above-described optical effect is expressed by Expression (1) shown below.

$$\theta = \alpha 1 \quad (1)$$

Expression (1) means that the divergence angle θ of light exiting the liquid crystal display device 25 is determined by only two parameters, i.e., the shape (radius) of the second microlenses 44M (the shape or radius may be represented by a) and the focal length (represented by f2) of the second microlenses 44M and that the divergence angle β of illumination light has no influence on the divergence angle θ of exiting light. According to the present embodiment, the divergence angle β of illumination light is eliminated when the light exits the liquid crystal display device 25, and the exiting divergence angle θ can be smaller by the angle β than that in a case wherein only the first microlenses 42M are used.

As a result, according to the present embodiment, the focal length of the first microlenses 42M can be kept short in accordance with the F-number of the projection lens 27, and the amount of optical vignetting at the black matrix 47 can be made smaller than that in the case wherein only the first microlenses 42M are used. Such an effect makes it possible to keep the focal length of the first microlenses 42M significantly smaller than that in the related art without reducing the effective aperture ratio. It is also possible to keep the size of converging spots formed at the pixel apertures 46A significantly smaller than that in the related art. Thus, the liquid crystal display device 25 can be provided with a high effective aperture ratio.

In the present embodiment, since the size of converging spots can be made sufficiently small with respect to the pixel apertures 46A when compared to the related art, the incidence divergence angle β can be greater than those in the related art. As will be apparent from FIG. 4, the size of converging spots can be increased to the limit of the aperture dimension of the pixel apertures 46A by increasing the incident divergence angle β, whereby the amount of light exiting the device can be increased.

In addition, aperture efficiency can be further improved by employing an optical design in which the beam waits of light beams are located between the first microlenses 42M and the second microlenses 44M as shown in FIG. 4 and disposing the pixel apertures 46A in such beam waist positions.

Figure 5:
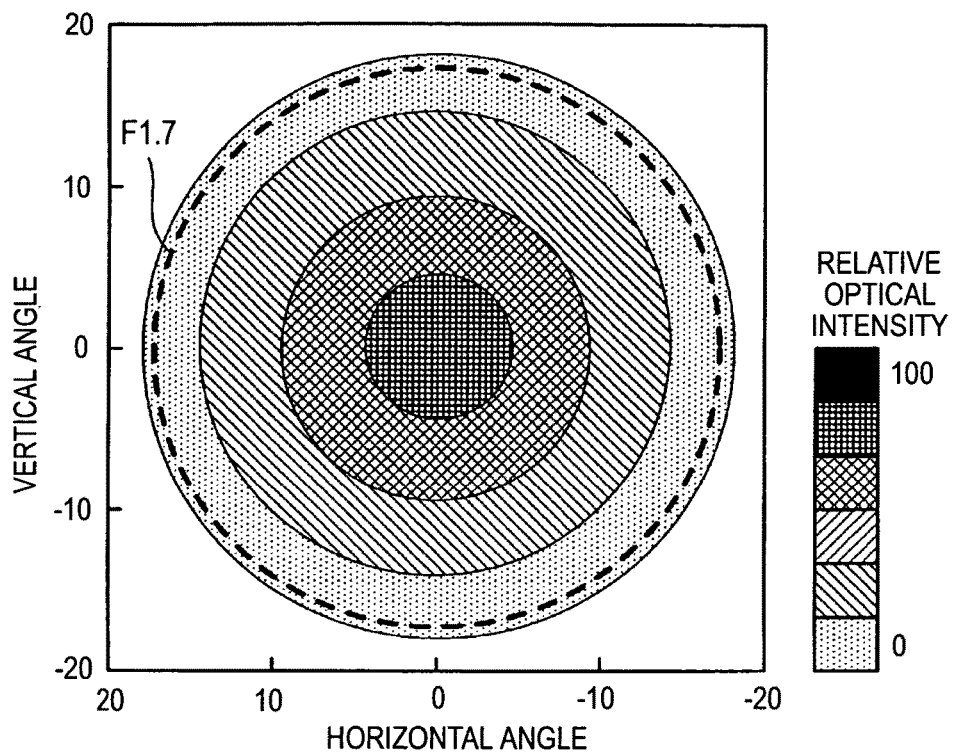
FIG. 5 is a schematic graph showing a distribution of angles of light exiting a liquid crystal display device according to the related art utilizing first microlenses only.
Figure 6:
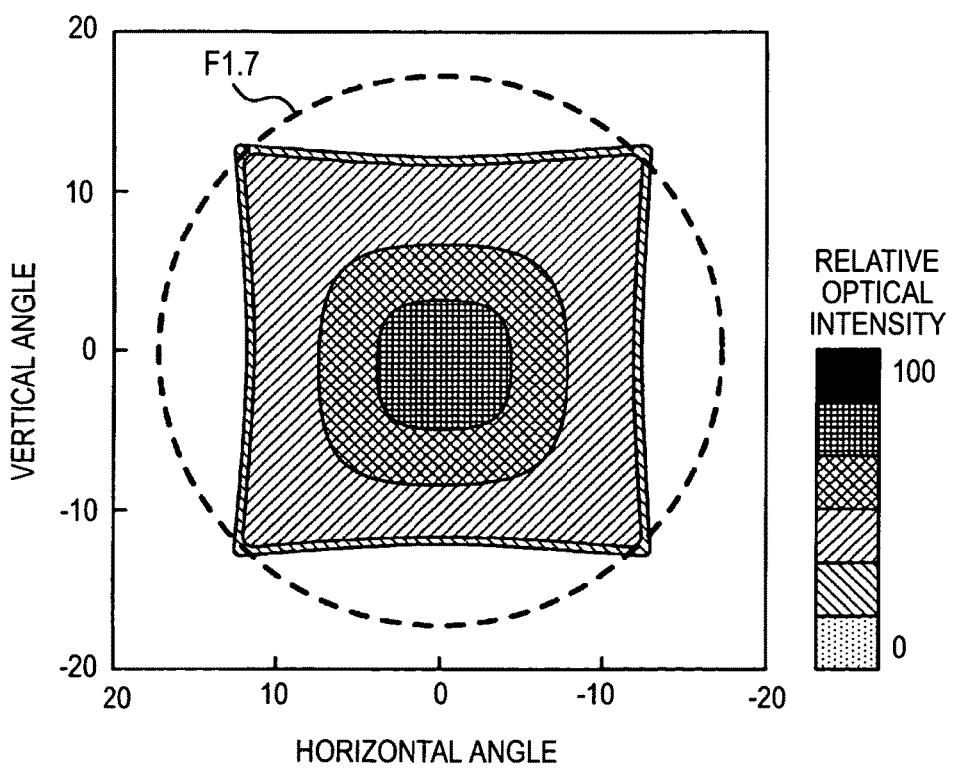
FIG. 6 is a schematic graph showing a distribution of angles of light exiting the liquid crystal display device according to the embodiment of the invention.

The inventors carried out a simulation to confirm the advantages of the projection type liquid crystal display apparatus 1 of the present embodiment. FIGS. 5 and 6 are graphs schematically showing results of the simulation. FIG. 5 shows a distribution of angles of light beams exiting a liquid crystal display device according to the related art utilizing first microlenses only, and FIG. 6 shows a distribution of angles of light beams exiting a liquid crystal display device according to the present embodiment. The simulation was carried out using illumination light having a divergence angle of 12 deg and a pixel pitch of 8.4 μm (aperture ratio of 55%).

Generally speaking, the projection type liquid crystal display apparatus 1 according to the embodiment suffered from less divergence of light compared to the projection type liquid crystal display apparatus according to the related art, as shown in FIGS. 5 and 6. When the F-number of the projection lens was set at 1.7 under the same condition, the amount of light projected by the projection type liquid crystal display apparatus 1 according to the present embodiment was 10% greater than the amount of light projected by the other display.

Since exiting light has a small divergence angle α according to the present embodiment, the F-number of the projection lens 27 can be set greater than those in the related art with the amount of projected light kept at the same level as in the related art. Thus, the cost of the projection lens 27 can be kept low. For example, in the case of the above-described example, the use of the liquid crystal display devices 25 according to the embodiment, allows the F-number of the projection lens 27 to be increased from 1.7 to 2.0 with the amount of projected light kept at the same level as in the related art.

As described above, the first microlenses 42M and the second microlenses 44M of the projection type liquid crystal display apparatus 1 according to the present embodiment are disposed such that the groups of microlenses are located in the focus positions of each other. Thus, divergence of illumination light can be avoided, and the incident divergence angle of illumination light can be increased to achieve high utilization of light.

In addition, since the F-number of the first microlenses 42M can be set as small as the F-number of the projection lens 27, there is no need for providing the first microlenses 42M with a long focal length in consideration to optical vignetting at the projection lens 27, and optical vignetting at the black matrix can be suppressed.

Further, since the second microlenses are disposed on the light exiting side of the display, the F-number of the lenses can be set at a great value, and variations attributable to manufacturing processes can be suppressed.

In the present embodiment, the first microlenses 42M and the second microlenses 44M are disposed at such a distance from each other that the groups of microlenses are located in the focus positions of each other. However, it is not essential to dispose the microlenses at such a distance exactly. Brightness of 95% or more of the brightness obtained under the optimal condition can be achieved to provide stable characteristics when the distance between the microlenses is within the range of ±16% of the distance between the first microlenses 42M and the second microlenses 44M at which the groups of microlenses are exactly located in the focus positions of each other. More preferably, the distance between the microlenses is set within the range of ±11% of the optimal distance to achieve brightness of 98% or more of the brightness obtained under the optimal condition and hence more stable characteristics.

4. Manufacturing Method of Liquid Crystal Display Device

Figure 7:
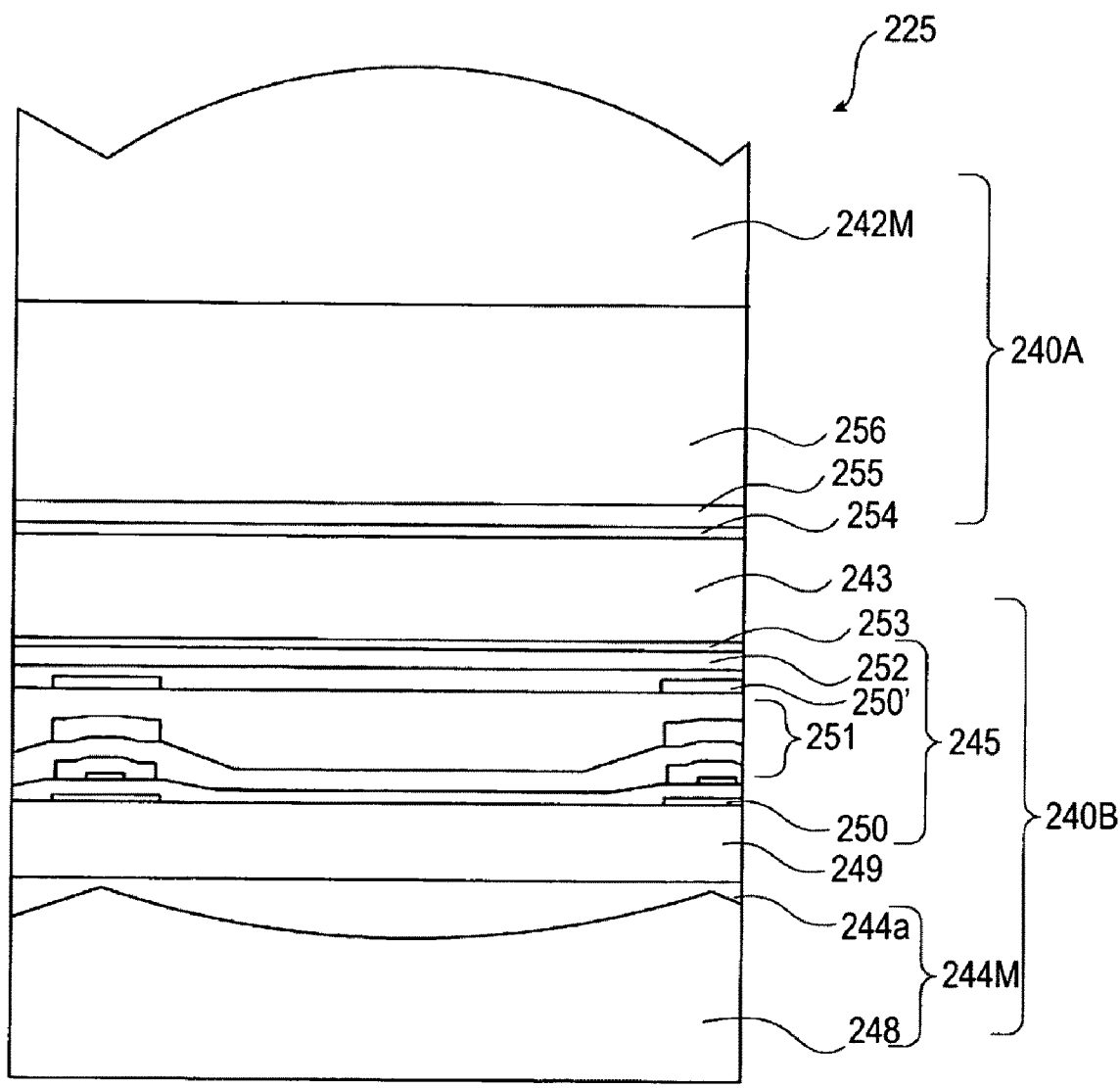
FIG. 7 shows an exemplary specific configuration of a liquid crystal display device according to the embodiment of the invention.

For example, a liquid crystal display device according to the above-described embodiment may have a specific configuration as shown in FIG. 7.

To provide a liquid crystal display device 225 shown in FIG. 7, a second microlens array including a plurality of second microlenses 244M is first formed on a transparent substrate 248. Further, a bottom light blocking film 250 is formed on the second microlenses 244M with a layer insulation film 249 interposed between them, and TFT devices 251, a top light-blocking film 250' and transparent electrodes 252 are thereafter formed in the order listed, whereby a pixel electrode section 245 is formed. Thereafter, an alignment film 253 is formed on the pixel electrode section 245 to complete an active matrix substrate 240B. A black matrix is substantially formed by the bottom light blocking film 250 and the top light blocking film 250'. An opposite substrate 240A which sandwiches a liquid crystal layer 243 in combination with the active matrix substrate 240B is formed by first microlenses 242M, a cover layer 256, transparent electrodes 255, and an alignment film 254.

Since the liquid crystal display device 225 is to be used in a projection type liquid crystal display apparatus, the TFT devices 251 are formed from high temperature polysilicon, and gate oxide films of the devices are formed at a processing temperature as high as 600 to 1000° C. For this reason, the second microlenses 244M must be formed from an inorganic material which can endure high temperature processes. Therefore, the following processes may be used in general to fabricate the components from the second microlenses 244M up to the TFT devices 251.

First, the transparent substrate 248 is etched to form semispherical recesses. Thereafter, inorganic films 244a made of a material having a high refractive index such as SiON are formed in the recesses using a P-CVD process, and polishing is performed to planarize the inorganic films 244a. Thus, the second microlenses 244M are formed.

Next, the layer insulation film 249 which may be a $SiO_2$ film is formed on the second microlenses 244M, and the bottom light-blocking film 250 is formed on the layer insulation film 249 using a metal having a high melting point such as WSi. Thereafter, the TFTs 251 are formed on the layer insulation film 249 and the bottom light-blocking film 250.

During such manufacturing processes, since the gate oxide films of the TFT devices 251 are processed at a temperature as high as 600 to 1000° C. as described above, the inorganic films 244a of the second microlenses 244M are also annealed at a temperature as high as 600 to 1000° C.

Figure 8:
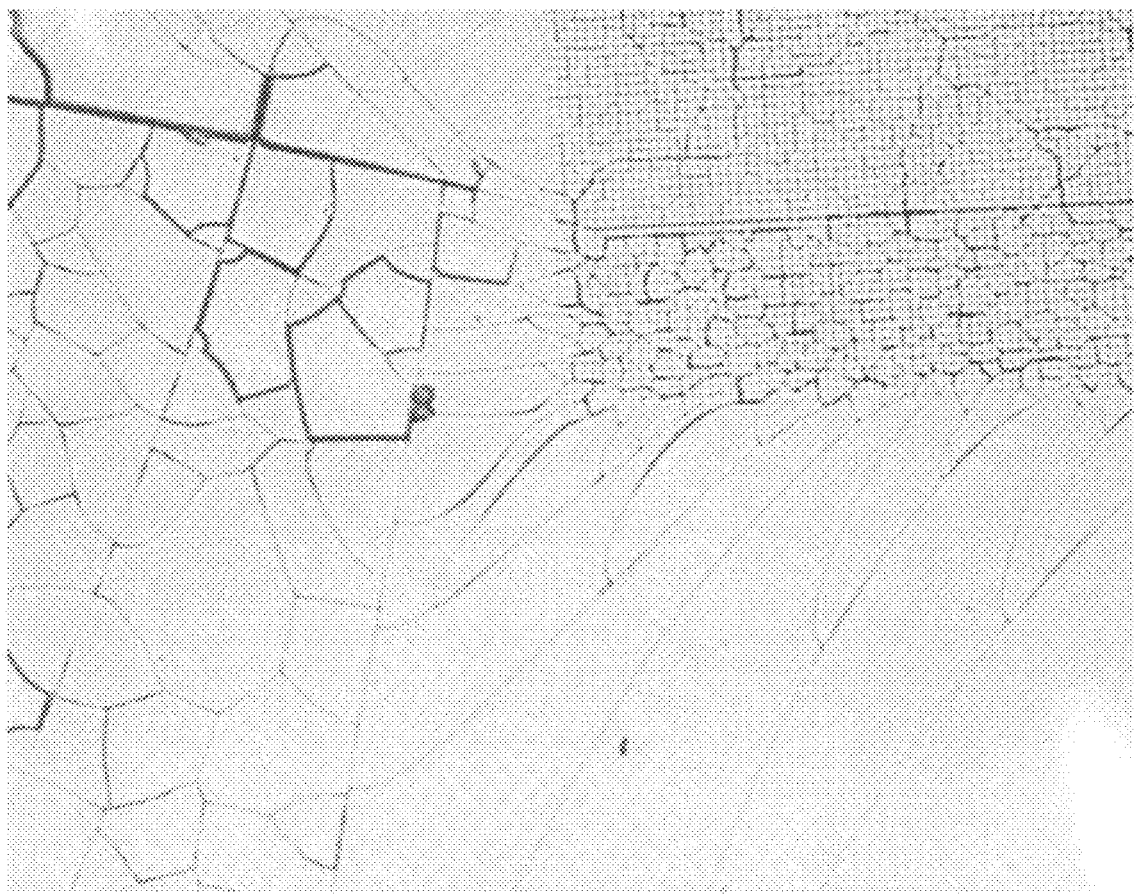
FIG. 8 is a photograph showing a sate an inorganic film.

However, since the inorganic films 244a spread throughout the liquid crystal display device 225 undergo very significant expansion that is proportionate to the size of themselves, the inorganic films 244a may be subjected to cracking or flaking attributable to thermal stress as shown in FIG. 8.

When the processing temperature is decreased during the formation of the TFT devices 251 in order to eliminate cracking or flaking of the inorganic films 244a of the second microlenses 244M, it will be difficult to obtain satisfactory gate oxide films and TFT characteristics.

Under the circumstance, a structure as described below may be used as the structure of the liquid crystal display device in order to allow the second microlenses 244M to be incorporated in the active matrix substrate without decreasing the processing temperature and without inducing cracking or flaking of the second microlenses 244M.

Figure 9:
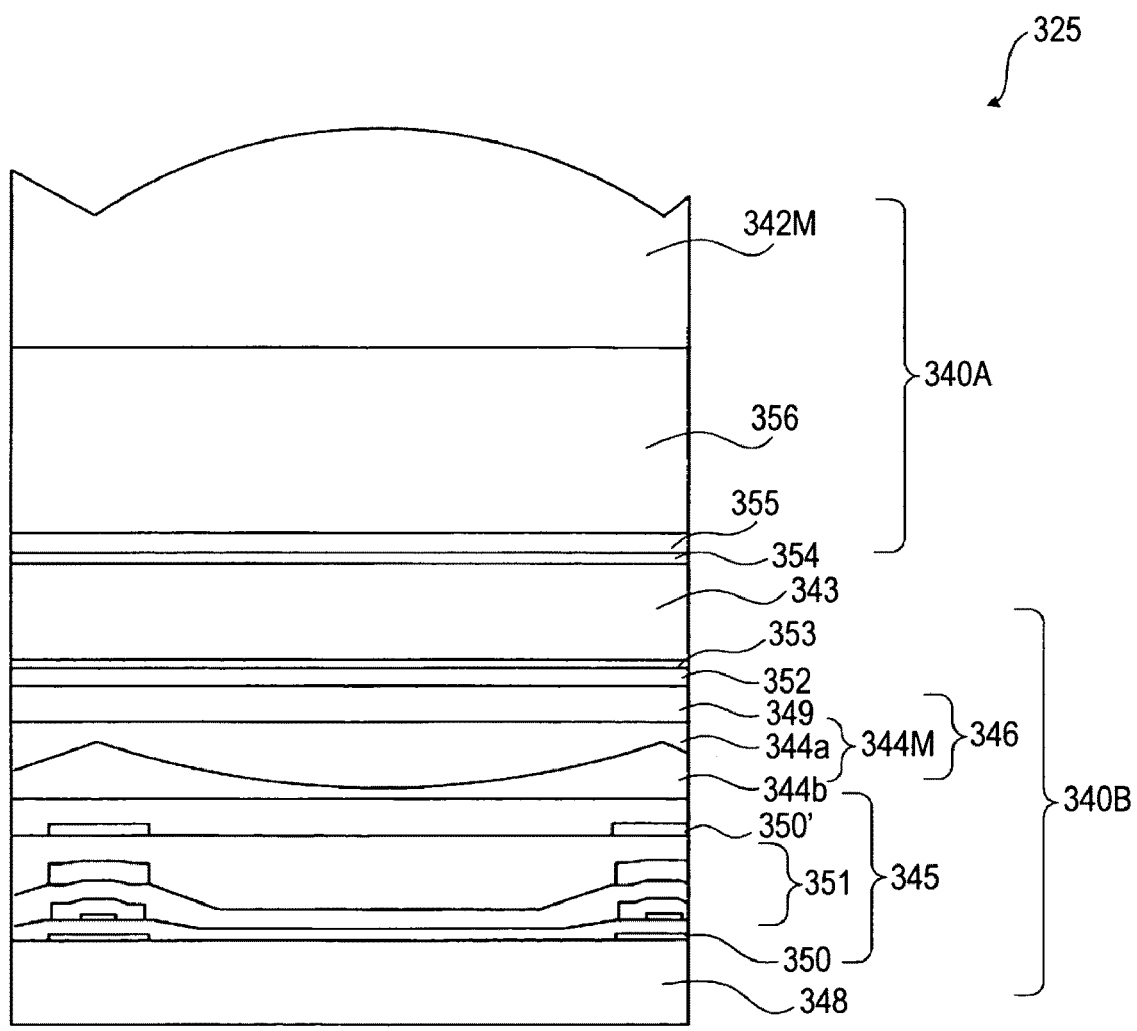
FIG. 9 shows an exemplary specific configuration of another liquid crystal display device according to the embodiment of the invention.

Specifically, in a liquid crystal display device 325 as shown in FIG. 9, second microlenses 344M are disposed in a layer insulation film 346 provided under transparent electrodes 352 of an active matrix substrate 340B. The second microlenses 344M are formed after forming TFT devices 351. A plurality of second microlenses 344M are formed as a microlens array in the active matrix substrate 340B. A black matrix is substantially formed by a bottom light-blocking film 350 and a top light-blocking film 350' which will be described later. An opposite substrate 340A which sandwiches a liquid crystal layer 343 in combination with the active matrix substrate 340B is formed by first microlenses 342M, a cover layer 456, transparent electrodes 355, and an alignment film 354.

In this liquid crystal display device 325, since the second microlenses 344M are formed in the layer insulation film 346, contacts must be provided in part of the second microlenses 344M to connect transparent electrodes 352 and drain electrodes of the TFT devices 351. Processes for manufacturing the liquid crystal display device 325 are as follows. Major parts of the processes will be described below.

First, a bottom light-blocking film 350 made of WSi or the like is formed on a transparent substrate 348. Thereafter, TFT devices 351 are formed. At this time, the processing temperature peaks at a temperature as high as 600 to 1000° C. when the gate oxide films are formed.

Next, a top light-blocking film 350' is formed, the film serving also as storage capacities and signal lines. The configuration of the film determines the shape of pixel apertures.

Next, a layer insulation film 344b is formed using a material having a low refractive index such as $SiO_2$. The layer insulation film 344b is etched to form semi-spherical parts, and a SiON film 344a which is a film having a high refractive index is formed over the semi-spherical parts using a P-CVD process. The SiON film 344a is then planarized using a CMP process to form the second microlenses 344M.

Contact holes are the formed at corners of the second microlenses 344M, and the contact holes are filled with a conductive material to form contacts.

Thereafter, a transparent electrode 352 and an alignment film 353 are formed in the order listed on the second microlenses 344M.

Since the second microlenses 344M are formed after the TFT devices 351 are formed as thus described, the second microlenses 344M are not exposed to the temperature as high as 600 to 1000° C. It is therefore possible to prevent the occurrence of cracking or flaking of the second microlenses 344M attributable to thermal stress.

Since the second microlenses 344M formed in the layer insulation film 346 can be made in the same size as TFT pixels, there is no loss in the amount of transmitted light attributable to insufficiency of the surface area of the second microlenses 344M.

First microlenses 342M provided on an opposite substrate 340A and the second microlenses 344M which are provided on an active matrix substrate 340B are located in the positions of the focuses of each other. The distance between the groups of lenses is adjusted by the thickness of a cover layer 356 which is provided on the first microlenses 342M.

Figure 10:
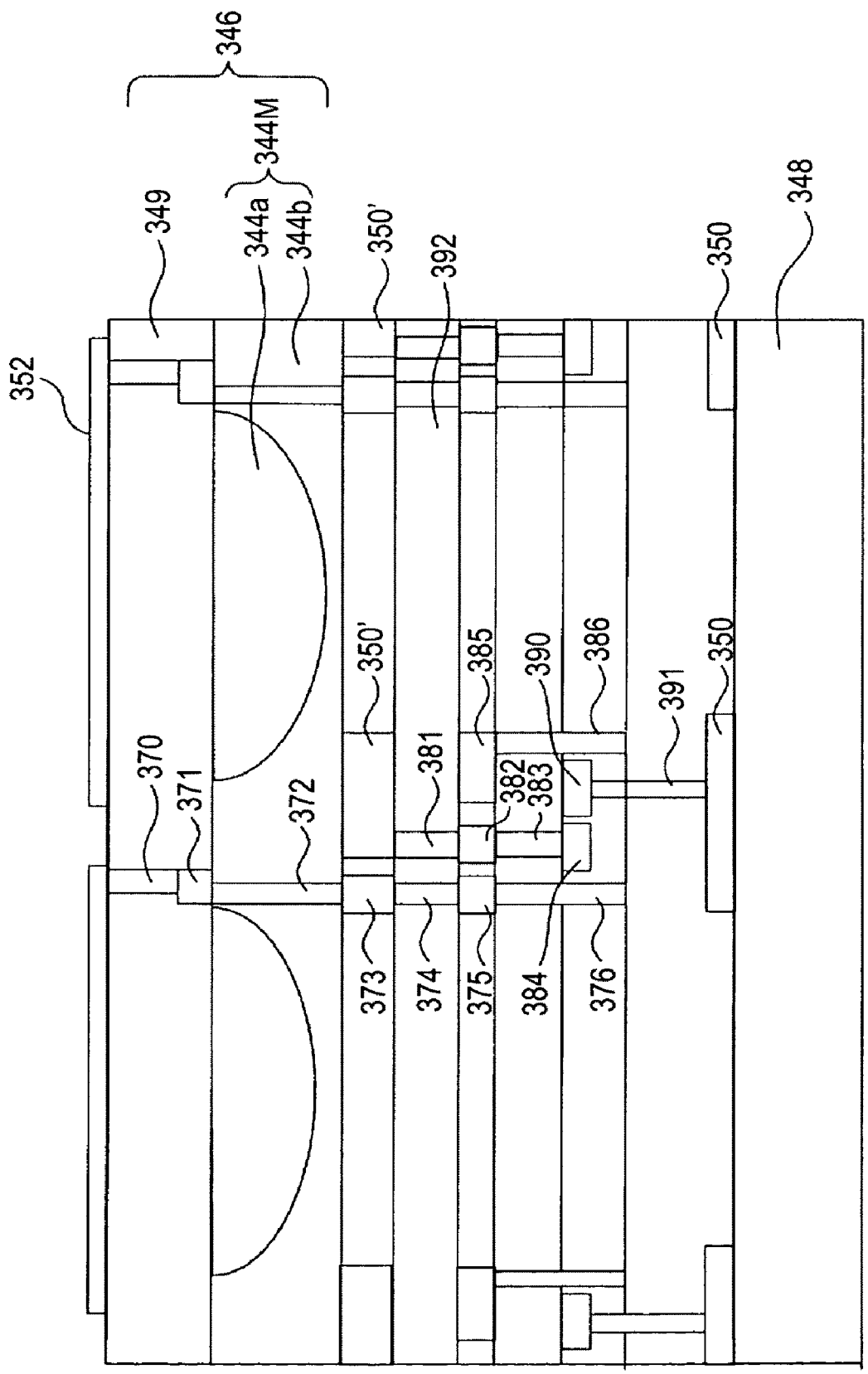
FIG. 10 shows an exemplary specific configuration of the liquid crystal display device according to the embodiment of the invention shown in FIG. 9.

FIG. 10 shows a sectional structure of a contact region where a transparent electrode 352 and a drain electrode of a TFT device 351 are electrically connected.

As shown in FIG. 10, a second microlens 344M is formed directly under the transparent electrode 352 with the layer insulation film 349 made of $SiO_2$ and the like interposed between them. ITO-drain contacts 370, 372, 374, and 376 for electrically connecting the transparent electrode 352 and the drain electrode of the TFT device 351 are formed so as to penetrate through a part of the second microlens 344M. The ITO-drain contacts 370, 372, 374, and 376 are connected to each other by connection electrodes 371, 373, and 375. In FIG. 10, reference numeral 385 represents a signal wiring; reference numeral 384 represents a Cs electrode; reference numeral 390 represents a gate electrode; reference numeral 386 represents a source contact; and reference numeral 391 represents a gate contact. The top light-blocking film 350' is connected to the Cs electrode 384 through a contact 381, a connection electrode 382, and another contact 383.

The second microlens 344M is formed in the layer insulation film 346 so as to avoid the position of the ITO-drain contact 370. The reason is as follows. The contact hole is formed in the layer insulation film 346 before the second microlens 344M is formed, and the layer insulation film 346 is thereafter isotropically etched into a semi-spherical shape to form the second microlens 344M. When the film is etched in a great amount, the contact hole can be encroached by the etching. Therefore, the effective size of the second microlens 344M is limited by the positional relationship between the center of the second microlens 344M and the ITO-drain contact 370.

Figure 11:
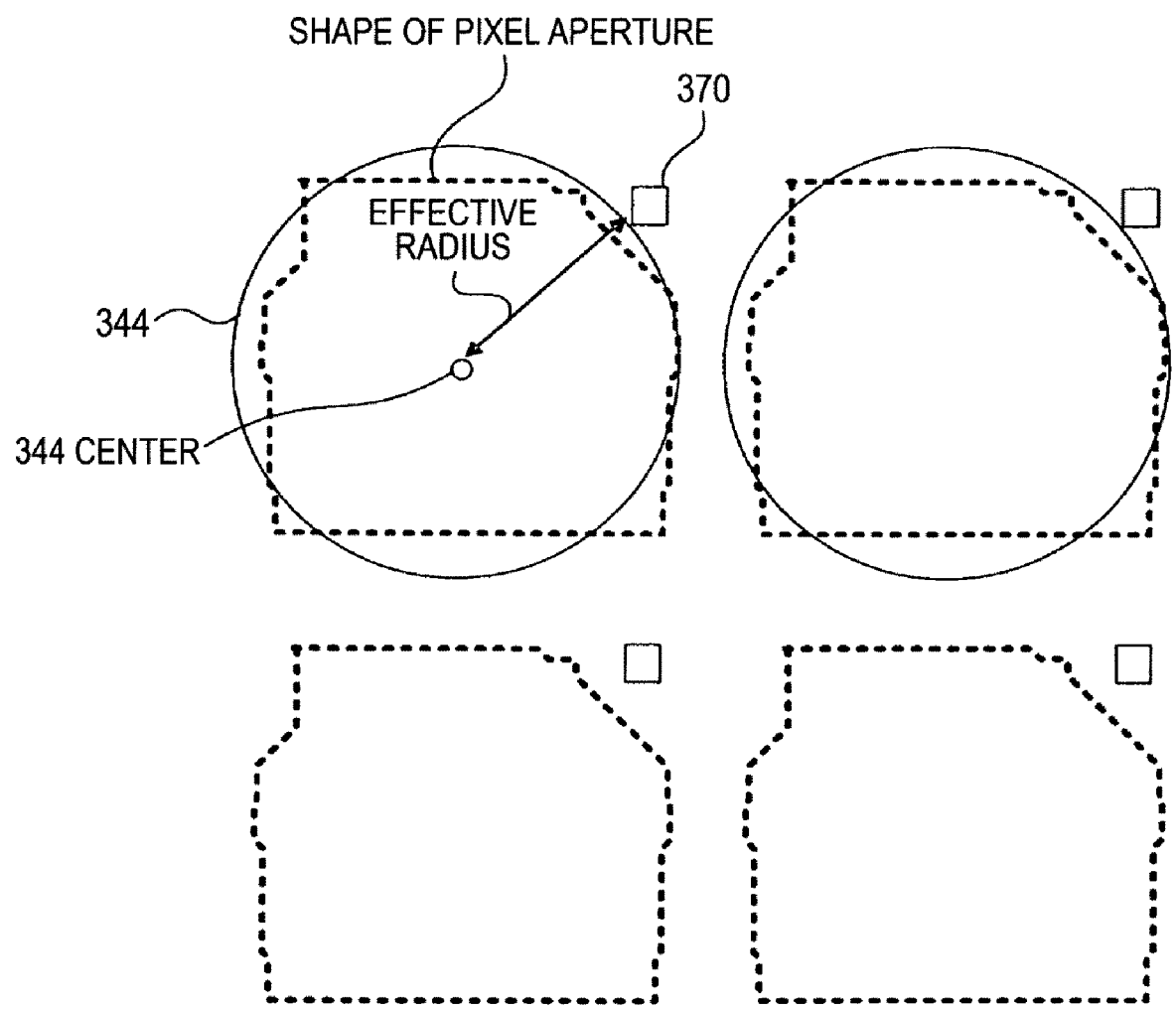
FIG. 11 shows another exemplary specific configuration of the liquid crystal display device according to the embodiment of the invention shown in FIG. 9.

FIG. 11 shows the positional relationship between the second microlens 344M and the ITO-drain contact 370 (372, 374, 376). The second microlens 344M has a circular shape having an effective radius which is set at a value smaller than the distance from the center of the microlens 344M to the drain contact 370 (372, 374, 376).

Although the second microlens 344M has been described as being formed in the layer insulation film 346 directly under the transparent electrode 352, the microlens is not limited to such a position. For example, the microlens may alternatively be formed in a layer insulation film 392 which is shown between the top light-blocking film 350' and the signal wiring 385 in FIG. 10.

In the configuration in which a microlens array is incorporated in both of the opposite substrate 340A and the active matrix substrate 340B of the liquid crystal display device 325, the second microlenses 344M on the active matrix substrate 340B are formed in the layer insulation film 346 between the transparent electrodes 352 and the TFT devices 351 after the TFT devices 351 are formed.

Therefore, the second microlenses 344M are formed after the process of forming the TFT devices 351, and no cracking or flaking of the second microlenses 344M attributable to thermal stress occurs. Thus, no degradation occurs in the characteristics of the second microlenses 344M, and improved manufacturability can be achieved.

The first microlenses 342M and the second microlenses 344M incorporated in the opposite substrate 340A and the active matrix substrate 340B, respectively, are formed such that the groups of microlenses are located in the focus positions of each other. Therefore, a high transmittance can be achieved, and optical vignetting at the projection lens can be kept very small. Thus, a projection type liquid crystal display apparatus projecting a great amount of light can be provided. Alternatively, the projection lens can be provided with a great F-number to keep the cost of the optical system small with the amount of light projected kept at the same level as in the related art.

5. Other Embodiments

Figure 12:
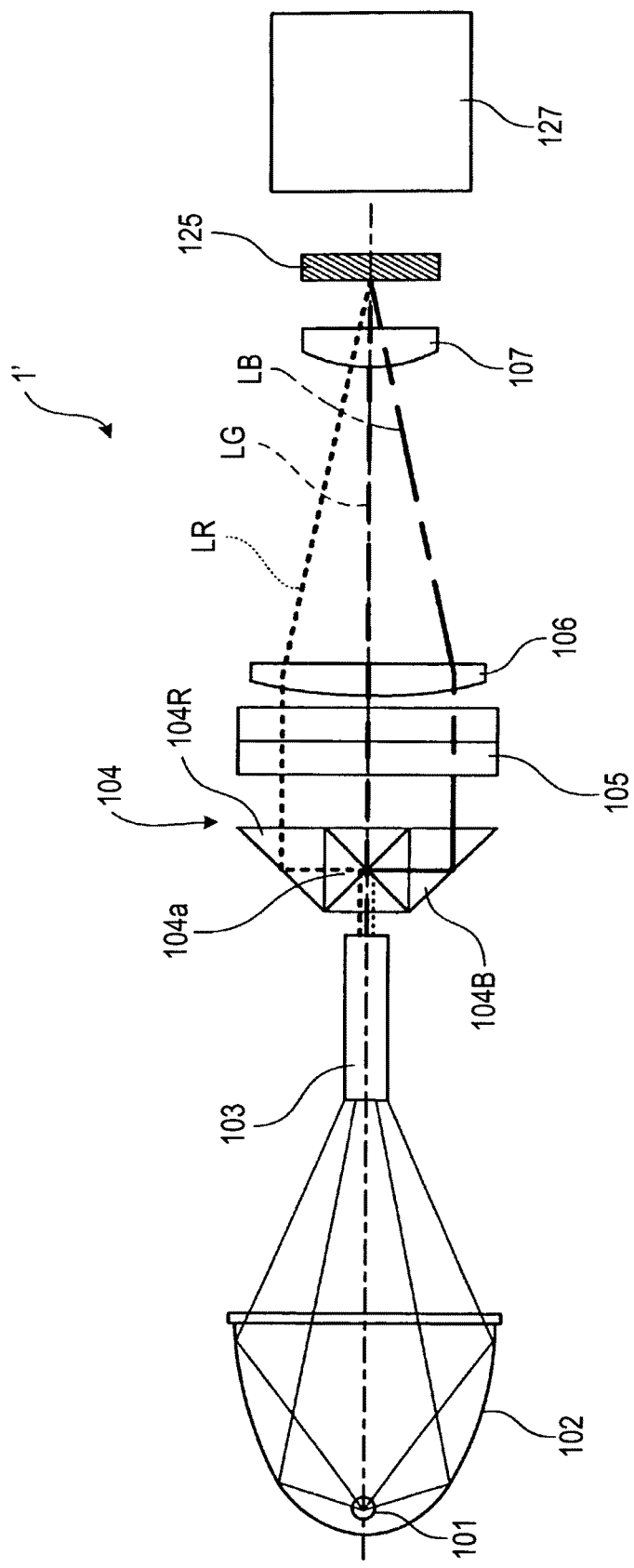
FIG. 12 shows an exemplary general configuration of a projection type liquid crystal display apparatus according to another embodiment of the invention.

Although a projection type liquid crystal display apparatus of the most common type utilizing three liquid crystal display devices has been described above as an embodiment of the invention by way of example, an embodiment of the invention will provide the same advantages as described above when applied to a single-plate color-display projection type liquid crystal display apparatus. FIG. 12 shows a configuration of a single-plate color-display projection type liquid crystal apparatus 1'.

As shown in FIG. 12, the single-plate color-display projection type liquid crystal display apparatus 1' includes a light source 101, a reflector 102, a rod integrator 103, a color separating section 104, a PS combining element 105, a condenser lens 106, a field lens 107, a liquid crystal display device 125, and a projection lens 127.

The light source 101 emits white light including red, green and blue light beams required for displaying a color image. The white light emitted by a light-emitting body of the light source 101 is projected by the reflector 102 toward the rod integrator 103. After exiting the reflector 102, the light is converged to the rod integrator 103. The rod integrator 103 makes the optical distribution of the incident light from the reflector 102 uniform and outputs the resultant light to the color separating section 104. The light from the rod integrator 103 enters the color separating section 104.

The color separating section 104 includes a color separating prism 104a which separates the incident light from the rod integrator 103 into three primary colors and reflection prisms 104R and 104B which reflect light beams reflected by the color separating prism 104a such that the light beams become substantially parallel to beams transmitted through the prism. The color-separating prism 104a of the color separating section 104 separates the incident light from the rod integrator 103 into three primary colors. For example, the prism transmits green light LG and reflects other light beams, i.e., red light LR and blue light LB in other respective directions. The red light LR reflected by the color separating prism 104a enters a reflecting prism 104R, and the prism 104R reflects the incident red light LR in such a direction that the red light becomes substantially parallel to the green light LG. The blue light LB reflected by the color separating prism 104a enters a reflecting prism 104B, and the prism 104B reflects the incident blue light LB in such a direction that the blue light becomes substantially parallel to the green light LG.

The PS combining element 105 separates light incident thereon into polarized light beams, i.e., a P-polarized light component and an S-polarized light component just as the PS combining element 15 does. Either polarized light (e.g., P-polarized light) exits the device with the polarization direction kept unchanged, and the other polarized light (S-polarized light, in this case) exits the element after being converted into the other type of polarized component (P-polarized light component in this case). The light beams which have exited the PS combining element 105 are condensed by the condenser lens 106 to enter the liquid crystal display device 125 through the field lens 107.

The condenser lens 106 and the field lens 107 are adjusted such that the light exiting surface of the rod integrator 103 and the liquid crystal display device 125 are in conjugate relationship with each other. Therefore, the red light LR, the green light LG, and the blue light LB form images overlapping each other on the liquid crystal display device 125. The field lens 107 also has the function of providing telecentric illumination such that light beams entering the liquid crystal display device 125 have a uniform angle distribution.

The liquid crystal display device 125 is what is called a transmissive liquid crystal display device, and the device optically modulates the light beams LR, LG, and LB entering from the field lens 107 according to an image signal and outputs the modulated light beams toward the projection lens 127 provided downstream thereof. The light beams in the respective colors which have entered the device at different angles are distributed to pixels of the respective colors by a first microlens array 42 (see FIG. 13) provided in the liquid crystal display device 125, and the transmittance of light passing through each pixel is controlled by the liquid crystal to display a color image (see JP-A-4-60538 for the fundamental principles of such an device).

Figure 13:
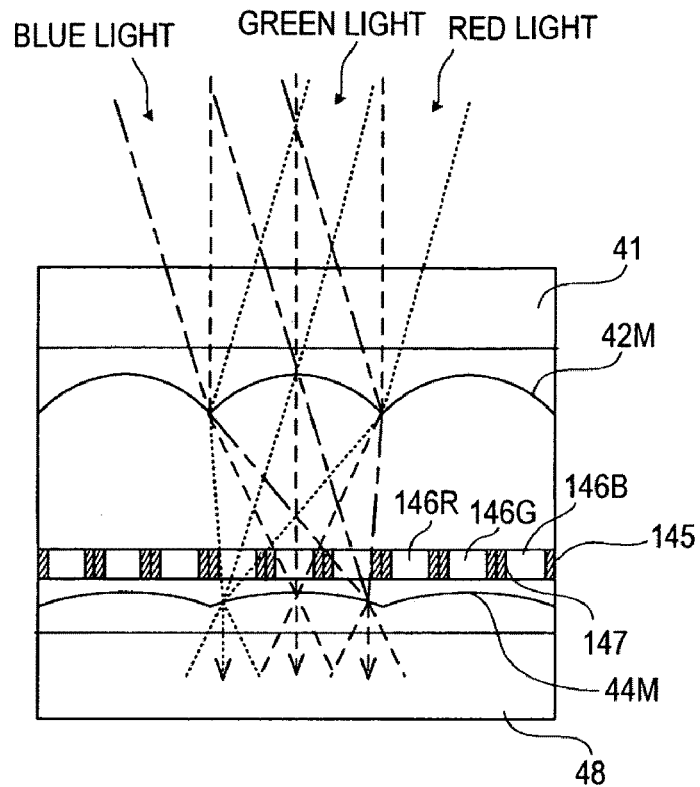
FIG. 13 shows an exemplary schematic configuration of a liquid crystal display device according to the embodiment of the invention.

As shown in FIG. 13, the liquid crystal display device 125 is similar in configuration to the above-described liquid crystal display device 25 except that pixel electrodes 146R, 146G, and 146B for respective colors R, G, and B are formed at each pixel of a pixel electrode section 145 and that a black matrix 147 is formed to intervene between the pixel electrodes. Features identical between the liquid crystal display devices 25 and 125 are indicated by like reference numerals, and they will not be specifically described.

As thus described, the liquid crystal display device 125 is similar in configuration to the liquid crystal display device 25. As a result, the divergence of illumination light is cancelled by the second microlenses 44M to provide the same advantages as those of the liquid crystal display device 25, and the divergence of red light LR and blue light LB can be also kept small. It is therefore possible to provide a projection type liquid crystal display apparatus projecting a great amount of light and having high color balance.

Figure 14:
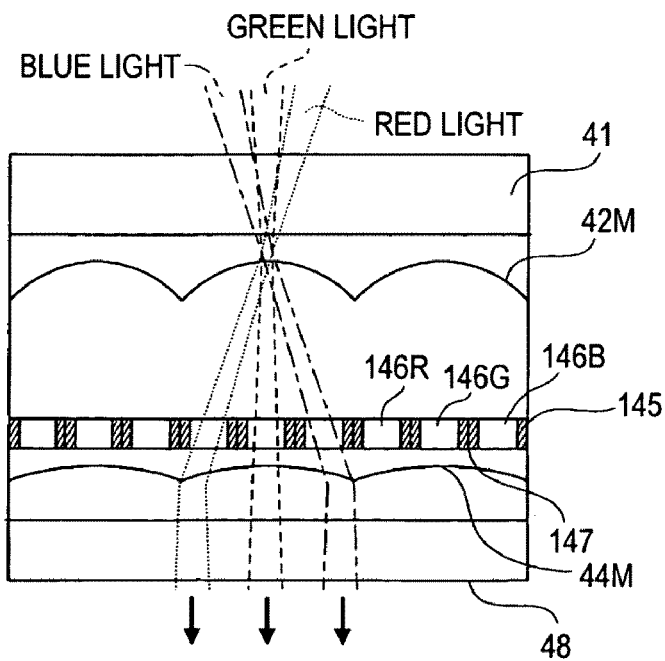
FIG. 14 shows another exemplary schematic configuration of the liquid crystal display device according to the embodiment of the invention shown in FIG. 13.

As shown in FIG. 14, the principal beams of the red light LR and the blue light LB are made parallel to the principal beam of the green light LG by the second microlenses 44M.

For example, let us assume that the divergence angle $\beta$ of illumination light is $\pm 3°$ in the horizontal direction and $\pm 7°$ in the vertical direction; the blue, green, and red principal beams are at angles of 8°, 0°, and −8°, respectively; and the F-number of the projection lens 127 is 1.7. A simulation carried out based on such an assumption provided calculation results indicating that the projection type liquid crystal display apparatus 1' according to the present embodiment provides advantageously great amounts of projected light. Specifically, in comparison to the amount of light projected using a configuration including only the first microlens array, the amount of light projected by the display was 1.216 times greater in the case of blue and red light and 1.033 times greater in the case of green light.

Figure 15:
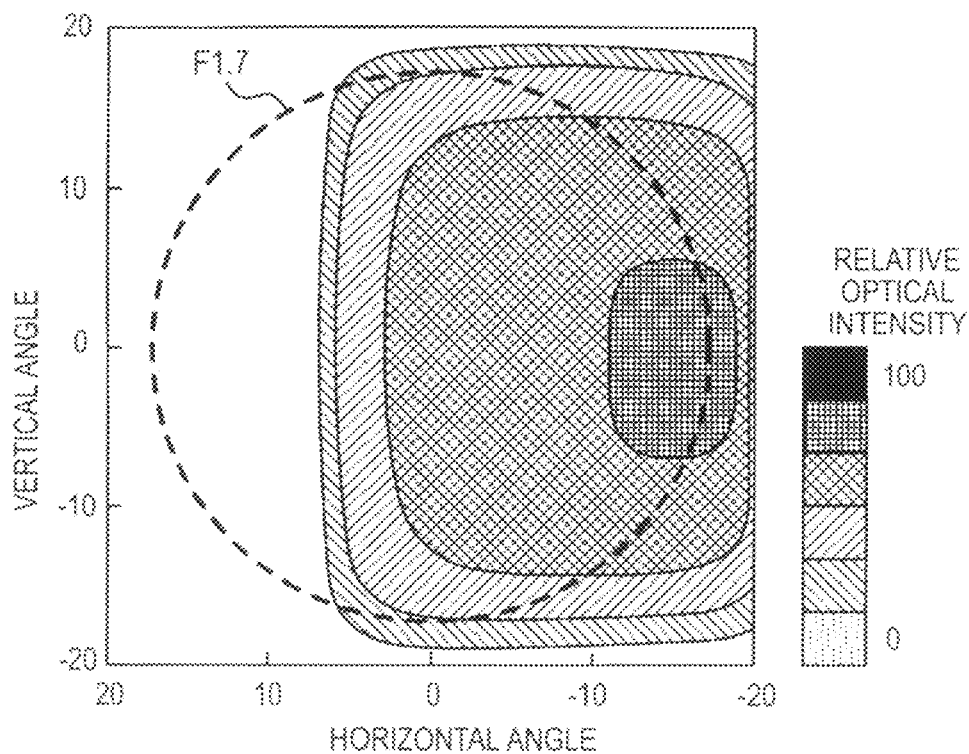
FIG. 15 is a schematic graph showing a distribution of exit angles of blue light obtained using a configuration according to the related art including only a first microlens array.
Figure 16:
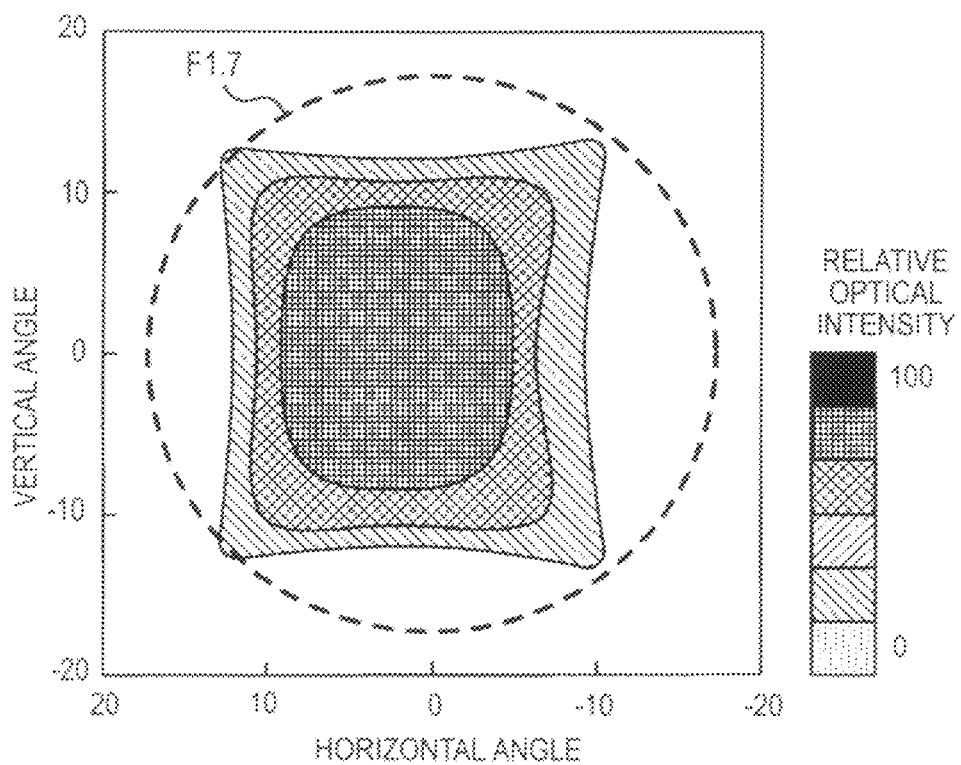
FIG. 16 is a schematic graph showing a distribution of exit angles of blue light obtained by the projection type liquid crystal display apparatus according to the embodiment shown in FIG. 12.
Figure 17:
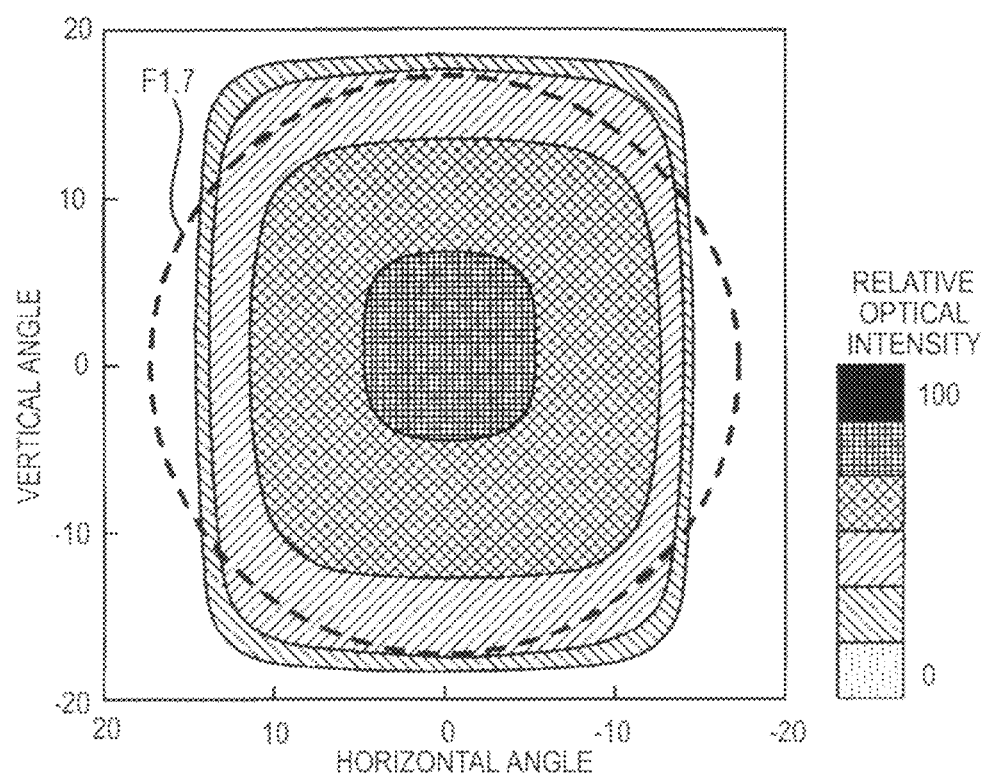
FIG. 17 is a schematic graph showing a distribution of exit angles of green light obtained using the configuration according to the related art including only the first microlens array.
Figure 18:
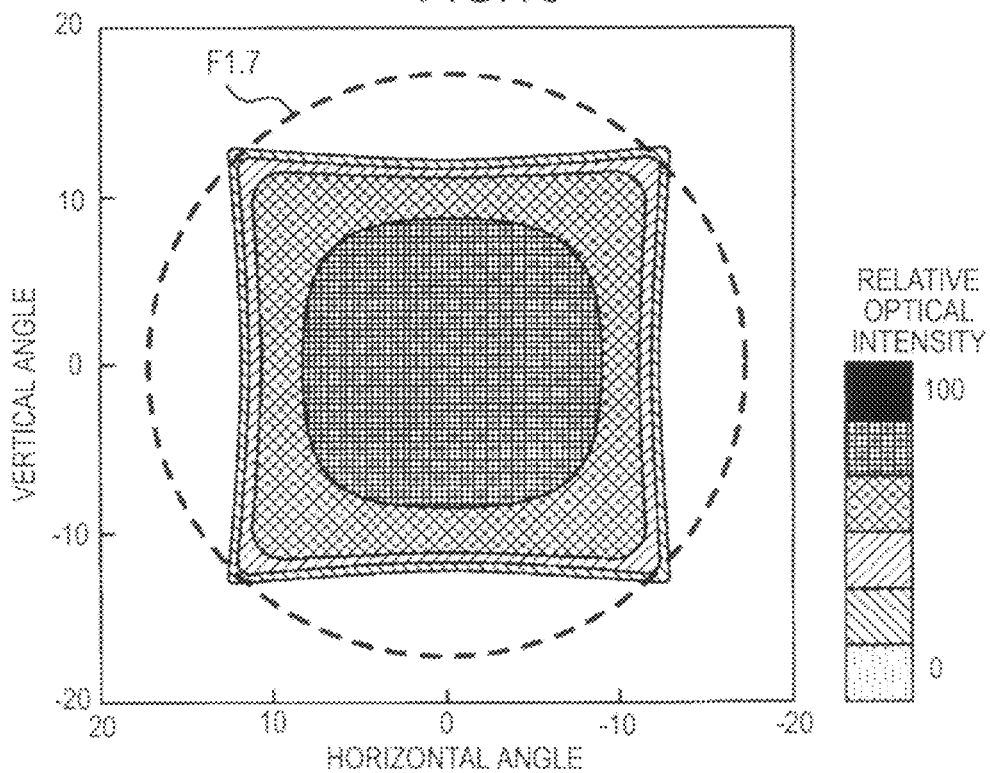
FIG. 18 is a schematic graph showing a distribution of exit angles of green light obtained by the projection type liquid crystal display apparatus according to the embodiment shown in FIG. 12.

FIGS. 15 to 18 are schematic graphs showing distributions of exit angles of blue light LB and green light LG obtained by the simulation. FIG. 15 shows a distribution of exit angles of blue light obtained using a configuration according to the related art including only the first microlens array. FIG. 16 shows a distribution of exit angles of blue light obtained by the projection type liquid crystal display apparatus 1' of the present embodiment. FIG. 17 shows a distribution of exit angles of green light obtained using the configuration according to the related art including only the first microlens array. FIG. 18 shows a distribution of exit angles of green light obtained by the projection type liquid crystal display apparatus 1' of the present embodiment.

As will be apparent from the illustrated results, the green light LG projected by the projection type liquid crystal display apparatus 1' of the present embodiment is subjected to a lower level of divergence in general. Such an advantage is more significant for the blue light LB and the red light LR because the angle of their principal beams are corrected by the second microlenses 44M.

While the above-description is based on an assumption that an arc light source is used as the light source 101, an optical system utilizing an LED or laser may alternatively be used. The rod integrator 103 may be any type of rod integrator which may be constituted by a fly-eye lens, mirror, or glass prism.

The present application contains subject matter related to that disclosed in Japanese Priority Patent Applications JP 2009-238211 filed in the Japan Patent Office on Oct. 15, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A projection type liquid crystal display apparatus comprising:
    a light source emitting light;
    a liquid crystal display device optically modulating the light emitted by the light source; and
    a projection lens projecting the light modulated by the liquid crystal display device, wherein the liquid crystal display device includes
    a liquid crystal layer,
    a pixel electrode section having a plurality of two-dimensionally disposed pixel apertures through which light can pass,
    a first microlens array which is formed on a light entering side of the device with respect to the liquid crystal layer and which is a two-dimensional array of a plurality of first microlenses provided in association with the plurality of pixel apertures, and
    a second microlens array which is formed on a light exiting side of the device with respect to the liquid crystal layer and which is a two-dimensional array of a plurality of second microlenses provided in association with the plurality of pixel apertures,
    the F-number of the first microlenses is set at a value equal to or greater than the F-number of the projection lens, and
    the first microlenses and the second microlenses are disposed such that the groups of microlenses are located in the focus position of each other.

2. A projection type liquid crystal display apparatus according to claim 1, wherein the first microlenses and/or the second microlenses include any of a spherical surface, an aspherical surface, or a Fresnel surface or two or more such surfaces in combination.

3. A projection type liquid crystal display apparatus according to claim 1 or 2, further comprising:
    an active matrix substrate provided on the light exiting side of the device with respect to the liquid crystal layer and carrying a TFT device and the second microlens array thereon, wherein
    the second microlens array on the active matrix substrate is disposed between the TFT device and the liquid crystal layer and formed after the TFT device is formed.

4. A projection type liquid crystal display apparatus comprising:
    a light source emitting light;
    a liquid crystal display device optically modulating the light emitted by the light source; and
    a projection lens projecting the light modulated by the liquid crystal display device, wherein
    the liquid crystal display device includes
        a liquid crystal layer,
        a pixel electrode section having a plurality of two-dimensionally disposed pixel apertures through which light can pass,
        a first microlens array which is formed on a light entering side of the device with respect to the liquid crystal layer and which is a two-dimensional array of a plurality of first microlenses provided in association with the plurality of pixel apertures, and
        a second microlens array which is formed on a light exiting side of the device with respect to the liquid crystal layer and which is a two-dimensional array of a plurality of second microlenses provided in association with the plurality of pixel apertures, and
        a lens surface of each of the first microlenses and the second microlenses constitutes a convex with respect to the light entering side.

5. A projection type liquid crystal display apparatus according to claim 4, wherein
    the F-number of the first microlenses is set at a value equal to or greater than the F-number of the projection lens, and
    the first microlenses and the second microlenses are disposed such that the groups of microlenses are located in the focus position of each other.

6. A projection type liquid crystal display apparatus according to claim 4 or 5, wherein the first microlenses and/or the second microlenses include any of a spherical surface, an aspherical surface, or a Fresnel surface or two or more such surfaces in combination.

7. A projection type liquid crystal display apparatus according to claim 4 or 5, further comprising:
    an active matrix substrate provided on the light exiting side of the device with respect to the liquid crystal layer and carrying a TFT device and the second microlens array thereon, wherein
    the second microlens array on the active matrix substrate is disposed between the TFT device and the liquid crystal layer and formed after the TFT device is formed.

* * * * *